Patented Oct. 13, 1931

1,826,724

UNITED STATES PATENT OFFICE

FREDERICK E. E. BOOSS AND RUFUS N. CHAMBERLAIN, OF CHICAGO, ILLINOIS, ASSIGNORS, BY MESNE ASSIGNMENTS, TO GOULD STORAGE BATTERY CORPORATION, OF DEPEW, NEW YORK, A CORPORATION OF DELAWARE

MEANS FOR PROTECTING STORAGE BATTERY GRIDS

No Drawing.    Application filed November 12, 1927.    Serial No. 232,936.

The invention relates to storage batteries and has special reference to the grids of the positive plates in a lead-acid lead battery.

It is well known that the lead or antimony-lead plates or grids in batteries of the pasted plate type are liable to corrode, resulting in cracking and breaking and falling away, or at least loosening, of the active material. In less extreme cases the active material may simply have its contact with the grid decreased but in any event there will be a serious impairment of the effectiveness of the battery. The plan has been adopted of employing glass wool mats under slight pressure against the surfaces of pasted positive plates and this has increased the life of the active material both mechanically and chemically. However, unless corrosion of the grids be prevented the full benefits derived from the use of such glass wool separators cannot be obtained.

It is with the above facts in view that we have developed the present invention which has for its principal object the provision of a method whereby corrosion of the plates or grids will be avoided without reducing the electrical capacity.

Another object of the invention is to provide a method of protecting the plates or grids against corrosion which may be carried out without involving any changes in the methods of manufacture of the plates or grids themselves or the replacement of already existing grids.

Still another object of the invention is to provide a method of this nature which may be carried out successfully in connection with batteries which are already in service and which have been in use for a considerable length of time.

Yet another object of the invention is to provide a method of this character which may be carried out or applied by the user and without the possession of any unusual degree of knowledge, or the exercise of a great degree of care or skill.

More specifically, it is an object of the invention to provide a method of protecting the positive plates or plate grids against corrosion by adding a suitable chemical to the electrolyte.

An additional object is to provide a protecting method which will be simple, inexpensive and be easy to carry out or follow.

To the attainment of the foregoing and other objects and advantages the invention preferably consists in the employment of the chemical material to be set forth, together with the mode of application thereof as will be hereinafter more fully described and claimed.

In actual practice we have discovered that cobalt has the property of protecting the positive lead or lead antimony plates or plate grids against corrosion. The cobalt is used in the form of a salt thereof, preferably cobaltous sulphate, only a small percentage thereof, approximately one-tenth of one per cent by weight being necessary. This proportion is only approximate as it is readily conceivable that there may be appreciable variations though an excessive amount will detract from the electrical capacity of the battery. This chemical is preferably incorporated by adding it to the sulphuric acid electrolyte of the battery.

In the case of new equipment or fresh manufactures it is advisable to dissolve the cobaltous sulphate in the electrolyte before the latter is added to or poured into the cell. However, this is not essential as in the case of batteries already in operation some of the electrolyte may be withdrawn into an acid-proof receptacle where the required amount of cobaltous sulphate may be added and dissolved. The solution is then returned to the cell by pouring it upon or into the electrolyte, it being preferable that it be added a little at a time to insure a general distribution.

The chemical reactions involved in the protective action of the cobaltous sulphate are not entirely known at the present time and are doubtless quite involved. In general, it may be stated that the cobalt or cobaltous sulphate or other suitable salt will prevent the formation of any appreciable layer or thickness of lead peroxide on the surface of the antimonial lead grid or the pure lead grid in case such is used. If such a coating is permitted to form it would naturally, in time, drop away, a fresh coat would form, drop away and so on, but by preventing its formation in the first place it is evident that there will be no eating away of the plate or plate grid.

While we have described the cobalt as being added to the electrolyte in the form of a salt dissolved therein it is conceivable that it might be added in other ways, such, for instance as by being embodied in metallic form in the grid itself, or possibly even plated onto the grid, the essential feature being its presence in some form or other. We reserve the right to make these and such other variations as will not depart from the spirit of the invention or the scope of the claims hereunto appended.

Having thus described the invention, we claim:

1. In a storage battery having lead plates immersed in an electrolyte, means for protecting the plates against corrosion comprising the combination with the plates and the electrolyte of a cobalt compound in the proportion of approximately $\frac{1}{10}$ of 1% by weight of the electrolyte.

2. In a battery including lead plates and grids immersed in an acid electrolyte, means for preventing decomposition of the plates comprising the combination therewith and with the electrolyte of a cobalt salt in the proportion of approximately $\frac{1}{10}$ of 1% by weight of the electrolyte.

3. In a storage battery including a lead and lead antimony plates and grids immersed in an acid electrolyte, means for preventing corrosion of the plates and grids comprising the combination therewith and with the electrolyte of a soluble salt of cobalt in a quantity approximately $\frac{1}{10}$ of 1% by weight of the electrolyte.

4. In a storage battery including lead and lead antimony positive plates and plate grids subject to the action of an acid electrolyte, means for preventing decomposition of the plates and grids comprising the combination therewith and with the electrolyte of a soluble compound of cobalt dissolved in the electrolyte and amounting to approximately $\frac{1}{10}$ of 1% by weight of the quantity thereof.

5. In a storage battery including lead and lead antimony plates and grids immersed in an acid electrolyte, means for preventing corrosion and decomposition of the plates and grids comprising the combination therewith and with the electrolyte of cobaltous sulphate dissolved in the electrolyte and constituting approximately $\frac{1}{10}$ of 1% by weight thereof.

6. In a storage battery including plates immersed in an electrolyte and embodying lead in their structure, means for preventing corrosion and decomposition of the lead comprising the combination therewith and with the electrolyte of a cobalt compound in the maximum proportion of 1% by weight of the electrolyte.

7. In a storage battery including plates embodying lead in their structure, and an electrolyte in which the plates are immersed, the combination with the lead and the electrolyte of less than 1% by weight of a cobalt salt dissolved in the electrolyte and operating to prevent corrosion and decomposition of the lead.

In testimony whereof we affix our signatures.

FREDERICK E. E. BOOSS.
RUFUS N. CHAMBERLAIN.